United States Patent
Wideman et al.

(12) 
(10) Patent No.: US 6,300,449 B2
(45) Date of Patent: Oct. 9, 2001

(54) POLYMERIC DICYCLOPENTADIENE/ LIMONENE RESIN

(75) Inventors: Lawson Gibson Wideman, Hudson; Thomas Joseph Segatta, Copley; Denise Jeannette Keith, Akron, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/836,511

(22) Filed: Apr. 17, 2001

Related U.S. Application Data

(62) Division of application No. 09/246,391, filed on Feb. 9, 1999, now Pat. No. 6,245,873.

(51) Int. Cl.[7] .................................................. C08F 136/00
(52) U.S. Cl. ...................... 526/283; 526/131; 526/157; 526/283; 526/335; 526/336; 526/340.3
(58) Field of Search ..................... 526/131, 157, 526/283, 335, 336, 340.3

(56) References Cited

U.S. PATENT DOCUMENTS

| | | | |
|---|---|---|---|
| 3,466,267 | 9/1969 | Derfer | 260/80.7 |
| 3,634,374 | 1/1972 | Bell | 260/87.5 |
| 3,903,061 | 9/1975 | Cesca et al. | 260/80.78 |
| 3,927,144 | 12/1975 | Hayashi et al. | 260/888 |
| 3,981,958 | 9/1976 | Nakashima et al. | 260/878 |
| 4,038,346 | 7/1977 | Feeney | 260/887 |
| 4,102,834 | 7/1978 | Morimoto et al. | 260/4 |
| 4,577,006 | 3/1986 | Hollis | 526/283 |
| 4,687,794 | 8/1987 | Huddleston | 523/351 |
| 4,739,036 | 4/1988 | Colvin et al. | 528/389 |
| 4,740,559 | 4/1988 | Johansson | 525/185 |
| 4,752,507 | 6/1988 | Johansson | 427/385.5 |
| 4,824,921 | 4/1989 | Luvihn | 526/237 |
| 4,889,891 | 12/1989 | Durairaj et al. | 525/139 |
| 5,049,625 | 9/1991 | Tazuma et al. | 525/391 |
| 5,691,432 | 11/1997 | Williams | 526/283 |

FOREIGN PATENT DOCUMENTS

| | | | |
|---|---|---|---|
| 0063092 | 10/1982 | (EP) | C08L/21/00 |
| 0249904 | 12/1987 | (EP) | C08F/240/00 |

OTHER PUBLICATIONS

Chemical Abstract 56109, vol. 90, 1979 p. 60.
Chemical Abstracts, Section Ch. Week 198709, Abstract No. 002136270.
Chemical Abstracts, Section Ch. Week 198841, Abstract No. 002136271.
European Search Report.

*Primary Examiner*—Helen L. Pezzuto
(74) *Attorney, Agent, or Firm*—Bruce J. Hendricks

(57) ABSTRACT

This invention relates to a novel class of polymeric resins which have a softening point ranging from about 50° C. to about 220° C. and a molecular weight ranging from about 500 to about 42,000. The resins consist essentially of the polymers which result from the polymerization reaction between dicyclopentadiene and limonene. The polymeric resins are particularly useful in improving traction of the rubber when used in tire treads.

13 Claims, No Drawings

POLYMERIC DICYCLOPENTADIENE/ LIMONENE RESIN

This is a Divisional of application Ser. No. 09/246,391, filed Feb. 9, 1999, now U.S. Pat. No. 6,245,873.

BACKGROUND OF THE INVENTION

This invention relates to a polymeric resin which is the reaction product of the polymerization reaction between dicyclopentadiene and limonene. Use of the polymeric resins of the present invention in a rubber tire stock improves the traction and handling of the tire.

SUMMARY OF THE INVENTION

The present invention relates to a polymeric dicyclopentadiene/limonene resin. The polymeric resins of the present invention have softening points ranging from about 50° C. to about 220° C., and a molecular weight of from about 500 to about 42,000. The present invention also includes a blend of dicyclopentadiene/limonene resins and rubber stocks containing the dicyclopentadiene/limonene resin.

DETAILED DESCRIPTION OF THE INVENTION

The present invention relates to a polymeric resin consisting essentially of the reaction product of the polymerization reaction between dicyclopentadiene and limonene and having a softening point ranging from about 50° C. to about 220° C. and a molecular weight ranging from about 500 to about 42,000.

In addition, the present invention relates to a resin composition comprising a blend of two or more polymeric resins wherein each resin consists essentially of the reaction product of the polymerization reaction between dicyclopentadiene and limonene. Alternatively, the blend can be formed insitu that is, the reaction temperature may be raised during the polymerization to increase the molecular weight distribution and broaden the softening point.

In addition, there is disclosed a pneumatic tire having a tread comprised of a rubber stock comprising (1) a rubber selected from the group consisting of natural rubber, rubber derived from a diene monomer or mixtures thereof, and (2) a polymeric resin composition consisting essentially of the reaction product of the polymerization reaction between dicyclopentadiene and limonene; said resin having a softening point ranging from about 50 to about 220° C. and a molecular weight ranging from about 500 to about 42,000.

There is also disclosed a rubber stock comprising (1) a rubber selected from the group consisting of natural rubber, rubber derived from a diene monomer or mixtures thereof, and (2) a polymeric resin composition consisting essentially of the reaction product of the polymerization reaction between dicyclopentadiene and limonene; said resin having a softening point ranging from about 50 to about 220° C. and a molecular weight ranging from about 500 to about 42,000.

The terms "polymeric compound" and "polymer" when used to describe the resins of the present invention are intended to only include those molecules which contain a monomeric unit derived from dicyclopentadiene and limonene and where at least one of the monomeric units derived from the dicyclopentadiene or limonene is repeated. Therefore, the compounds formed by the reaction of a single dicyclopentadiene molecule and a single limonene are not polymeric as the term is used herein. The term monomeric unit means a structure that occurs in a polymeric compound and which differs from the structure of dicyclopentadiene or limonene due to changes resulting from molecular reorientation during the linking to the adjacent structure. These changes may include addition to a double bond or the addition or removal of a hydrogen atom from the dicyclopentadiene or limonene.

The molar ratio of the dicyclopentadiene to limonene in the polymerization reaction may vary, depending on the desired properties of the final polymeric product. For example, the molar ratio of the dicyclopentadiene to limonene as starting material may range from about 1:10 to about 10:1. The preferred molar ratio of dicyclopentadiene to limonene may range from about 5:1 to 1:5 as starting material. The most preferred ratio ranges from about 2:1 to 1:2. As to the final product, the molar ratio of polymeric units derived from the dicyclopentadiene to limonene may range from about 8:1 to 1:8. The preferred molar ratio of dicyclopentadiene to limonene in the final product ranges from about 1:3 to 3:1 with a range of from about 2.1:1 to 1:2.1, being particularly preferred.

The polymerization reaction between the dicyclopentadiene may be a thermal (no catalyst) polymerization, or catalyzed, i.e., conducted in the presence of an acid catalyst. Examples of acid catalysts that may be used include Bronsted acid and Lewis acid-type catalysts. Such known acid catalysts include $H_2SO_4$, HCl, $H_3PO_4$; metal halides such as $BF_3$, $BCl_3$, $AlCl_3$, $AlBr_3$, $SnCl_4$, $ZnCl_2$, $SbCl_3$ and their etherates. The choice of a particular catalyst is dependent upon factors including the melting or boiling points of the reactants, desired rate of reaction, solvent, and pressure and temperature limitation of the production equipment, etc. When higher yields are desired, the metal halides or their etherates may be utilized. The preferred acid catalysts are $BF_3$ and $AlCl_3$. The most preferred catalyst is $AlCl_3$.

In the catalyzed polymerization process, the amount of catalyst may range from about 0.1 to about 20 weight percent of catalyst based on the total weight of reactants to be polymerized. Preferably, a range of from about 3 to about 5 weight percent of catalyst is preferred. The optimum concentration of catalyst depends on the nature of the solvent, if any, which effects the solubility of the catalyst as well as on the stirring efficiency inside the polymerization reactor. High catalyst concentration reduces the resin molecular weight distribution and, therefore, limits the amount of feed additive required for controlling the resin molecular weight.

The polymerization reaction may be carried out neat (without solvent) at or above the melting points of the reactants, or can be carried out in the presence of a solvent. The solvent may be an aliphatic $C_6$–$C_{12}$ hydrocarbon, an aromatic or haloaromatic ($C_6$–$C_9$) hydrocarbon, or a $C_6$–$C_9$ aliphatic halohydrocarbon. Examples of suitable solvents include hexane, heptane, cyclohexane, benzene, toluene, xylene, and chlorobenzene. The preferred solvents are hexane and cyclohexane.

The polymerization reaction may be conducted under a variety of operating conditions. The reaction pressure may vary and range from about one atmosphere to about 100 atmospheres with a pressure of from about two atmospheres to about ten atmospheres being preferred. The reaction temperature may range from about 0 to 100° C. with a preferred range being from about 30 to 50° C.

Depending on the reactivity of the reactants, amount of catalyst, reaction pressure and reaction temperature, the reaction time may vary. Generally speaking, the reaction time varies from about 1 to about 8 hours.

The molecular weight distribution of the polymeric resin of the present invention may range from about 500 to about 42,000. In a particularly preferred embodiment of the present invention, the resin composition comprises a blend of two or more individual polymeric resins each one of which is the reaction product of a polymerization reaction between dicyclopentadiene and limonene. Each individual polymeric resin preferably differs from the other by having a different molecular weight range. Generally speaking, all of the polymeric resins will exhibit some lower molecular weight values, however, not all of the individual resins may include the higher molecular values. In the alternative, all of the resins may have distributions that vary by their lower molecular values with the high molecular weight value relatively being the same. For example, when the resin blend comprises three individual polymeric resins, the first resin may have a molecular weight ranging from about 700 to about 24,000, the second resin may have a molecular weight ranging from about 700 to about 36,000, and the third resin may have a molecular weight ranging from about 700 to about 42,000.

In accordance to another embodiment of the present invention, the resin composition may comprise a blend of four individual resins. In accordance with this embodiment, the first resin may have a molecular weight ranging from about 500 to about 15,000, the second resin may have a molecular weight ranging from about 700 to about 15,000, the third resin may have a molecular weight ranging from about 3,000 to about 15,000, and the fourth resin may have a molecular weight ranging from about 4,000 to about 15,000.

The blend may be formed in-situ or mechanically blended.

The resin composition of the present invention has a softening point ranging from about 50 to about 220. For the purposes of the present invention, the term "softening point" is used to describe the temperature range from when wetting occurs in a capillary melting point tube to where the resin is completely liquid. Representative of suitable equipment to determine the relative softening point is a Thomas-Hoover Melting Point apparatus equipped with a silicon oil bath. In accordance with the embodiment of the present invention when the resin composition comprises a blend of three individual resins, the first resin may have a softening point ranging from about 134 to about 156° C., the second resin may have a softening point ranging from about 138 to about 180° C., and the third resin may have a softening point ranging from about 188 to about 208° C. In accordance with the embodiment of the present invention where the blend comprises four individual resins, the first resin may have a softening point ranging from about 55 to about 75° C., the second resin may have a softening point ranging from about 80 to about 131° C., the third resin may have a softening point ranging from about 126 to about 168° C., and the fourth resin may have a softening point range of about 168 to about 195° C.

Rubber stocks containing natural rubber or rubbers derived from a diene monomer may be modified with the resin compositions of the present invention. Examples of rubbers derived from a diene monomer include substituted and unsubstituted, saturated and unsaturated, synthetic polymers. The natural polymers include natural rubber in its various forms, e.g., pale crepe and smoked sheet, and balata and gutta percha. The synthetic polymers include those prepared from a single monomer (homopolymer) or a mixture of two or more copolymerizable monomers (copolymer) when the monomers are combined in the random distribution or block form. In addition to the diene monomers, other monomers may be used. Of all the monomers that may be used, the monomers may be substituted or unsubstituted and may possess one or more double bonds, for example, diene monomers, both conjugated and nonconjugated, and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene, homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50 percent by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene.

The rubber compounds which may be modified by the resins of the present invention are preferably cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

The amount of polymeric resins that may be used with the diene containing polymers may vary and depend on the polymer to be modified, the particular polymeric resin, the desired degree of modification and the like. Generally speaking, the polymeric resin is used in amounts ranging from about 5 to about 50 parts per hundred (phr) of diene polymer. Preferably, the polymeric resin is used in amounts of from about 5 to about 25 phr, with a range of from about 10 to about 25 phr being particularly preferred.

The polymeric resins may be incorporated in the diene containing polymer by conventional mixing procedures, for example, by adding them in a banbury mixer or by adding them to the rubber on a mill. Preferably, when the polymeric resins have higher molecular weights, it is recommended that they be ground to a fine powder to insure adequate dispersion. Such powders may be treated to suppress dust, for example, by the addition of oil, or they can be mixed with a binder, for example, a polymer latex, and granules or pellets containing up to 5 percent by weight of a binder. They can also be formulated as pre-dispersions or master-batched in a diene rubber stock, which pre-dispersions may contain, for example, from 15 to 50 percent by weight of the polymeric resin.

Similar to vulcanizing conventional rubber stocks, the rubber stocks containing the polymeric resins need a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. Generally speaking, the amount of sulfur vulcanizing agent ranges from about 0.1 to about 8 phr with a range of from about 1.5 to about 6 being preferred.

Conventional rubber additives may be incorporated in the rubber stock of the present invention. The presence of a sulfur vulcanizing agent and conventional additives are not considered to be an aspect of this invention. The additives commonly used in rubber stocks include fillers, plasticizers, curatives, processing oils, retarders, antiozonants, antioxidants and the like. The total amount of filler that may be used may range from about 45 to about 130 phr being preferred. Fillers include silicas, clays, calcium carbonate, calcium silicate, titanium dioxide and carbon black. Preferably, at least a portion of the filler is carbon black. Plasticizers, oils or mixtures thereof are conventionally used in amounts ranging from about 2 to about 150 phr with a range of about 5 to about 130 phr being preferred. The amount of plasticizer used will depend upon the softening effect desired. Examples of suitable plasticizers include aromatic extract oils, petroleum softeners including asphaltenes, saturated and unsaturated hydrocarbons and nitrogen bases, coal tar products, cumarone-indene resins and esters such as dibutylphthalate and tricresyl phosphate. Examples of oils are commonly known as highly aromatic process oil, process soybean oil and highly paraffinic process oil. Materials used in compounding which function as an accelerator-activator includes metal oxides such as zinc oxide, magnesium oxide and litharge which are used in conjunction with acidic materials such as fatty acid, for example, stearic acid, oleic acid, murastic acid, and the like. The amount of the metal oxide may range from about 1 to about 10 phr with a range of from about 2 to about 8 phr being preferred. The amount of fatty acid which may be used may range from about 0.25 phr to about 5.0 phr with a range of from about 0.5 phr to about 2 phr being preferred.

Accelerators may be used to control the time and/or temperature required for vulcanization of the rubber stock. As known to those skilled in the art, a single accelerator may be used which is present in amounts ranging from about 0.2 to about 3.0 phr. In the alternative, combinations of two or more accelerators may be used which consist of a primary accelerator which is generally used in a larger amount (0.3 to about 3.0 phr), and a secondary accelerator which is generally used in smaller amounts (0.05 to about 1.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-di-methyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide. Preferably, the accelerator is a sulfenamide.

A class of compounding materials known as scorch retarders are commonly used. Phthalic anhydride, salicyclic acid, sodium acetate and N-cyclohexyl thiophthalimide are known retarders. Retarders are generally used in an amount ranging from about 0.1 to 0.5 phr.

Preformed phenol-formaldehyde type resins may be used in the rubber stock and are generally present in an amount ranging from about 1.0 to about 5.0 phr, with a range of from about 1.5 to about 3.5 phr being preferred.

Conventionally, antioxidants and some times antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), pages 282–286. Antidegradants re generally used in amounts from about 0.25 to about 5.0 phr with a range of from about 1.0 to about 3.0 phr being preferred.

The mixing of the rubber composition can be accomplished by methods known to those having skill in the rubber mixing art. For example, the ingredients are typically mixed in at least two stages; namely, at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and polymeric resin are mixed in one or more non-productive mix stages. The terms "non-productive" and "productive" mix stages are well known to those having skill in the rubber mixing art.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

In the following examples, the Flexsys Rubber Process Analyzer (RPA) 2000 was used to determine dynamic mechanical Theological properties. The curing conditions were 160° C., 1.667 Hz, 15.8 minutes and 0.7 percent strain. A description of the RPA 2000, its capability, sample preparation, tests and subtests can be found in these references. H A Pawlowski and J S Dick, Rubber World, June 1992; J S Dick and H A Pawlowski, Rubber World, January 1997; and J S Dick and J A Pawlowski, Rubber & Plastics News, April 26 and May 10, 1993.

The compounded rubber sample is placed on the bottom die. When the dies are brought together, the sample is in a pressurized cavity where it will be subjected to a sinusoidal oscillating shearing action of the bottom die. A torque transducer connected to the upper die measures the amount of torque transmitted through the sample as a result of the oscillations. Torque is translated into the shear modulus, G, by correcting for the die form factor and the strain. The RPA 2000 is capable of testing uncured or cured rubber with a high degree of repeatability and reproducibility. The tests and subtests available include frequency sweeps at constant temperature and strain, curing at constant temperature and frequency, strain sweeps at constant temperature and frequency and temperature sweeps at constant strain and frequency. The accuracy and precision of the instrument allows reproducible detection of changes in the compounded sample.

The values reported for the storage modulus, (G'), loss compliance (J") and tan delta are obtained from a strain sweep at 100° C. and 1 Hz following the cure test. These properties represent the viscoelastic response of a test sample to shear deformation at a constant temperature and frequency.

The following examples are presented for the purposes of illustrating and not limiting the present invention. All parts are parts by weight unless specifically identified otherwise.

EXAMPLE 1

A one liter stainless steel autoclave was charged with 170 grams of washed and dried dicyclopentadiene, 80 grams of washed and dried (+)-limonene and 100 milliliters of xylenes. The reactor was flushed with nitrogen, sealed and heated to 270° C. with stirring. The reactor pressure peaked at 185 psig at 270° C. The reactor pressure began to drop as the temperature was maintained at 270° C. Within about 15 minutes, the pressure dropped 20 to 30 psig. After one hour of residence time, the reactor was cooled. The contents were transferred to a flask and heated to about 170° C., and the pressure on the surface of the contents was reduced to about 25 inches of mercury vacuum. The stripped resin was poured from the flask as molten material at about 150° C. A softening point from 55– 75° C. was determined. The molecular weight range was determined to be 500 to 15,000.

EXAMPLE 2

The procedures of Example 1 were repeated except the residence time at 270° C. was two hours, instead of one hour. The softening point for this polymeric resin ranged from about 80 to 131° C. The molecular weight range was determined to be 700 to 15,000.

EXAMPLE 3

The procedures of Example 1 were repeated, except the residence time at 270° C. was 4 hours, and the polymeric resin product had a softening point ranging from about 126° C. to 168° C. The molecular weight range was determined to be 3,000 to 15,000.

EXAMPLE 4

The procedures of Example 1 were repeated except the residence time of 270° C. was for 6 hours instead of one hour, and the softening point for the resin ranged from about 168° C. to 195° C. The molecular weight range was determined to be 4,000 to 15,000.

EXAMPLE 5

The dicyclopentadiene/limonene resin from Examples 1–4, were combined by mixing 150 grams of each polymeric resin into a 2-liter stainless steel beaker. A hot plate was used to melt the polymeric resins and stirring gave a homogeneous mixture. The blend was cooled to room temperature, and chipped into small granular pieces, which exhibited an overall softening range of from about 78 to 173° C. The product was an amber-color solid.

EXAMPLE 6

A three liter round bottom flask was fitted with a mechanical stirrer, a constant temperature water bath, a thermocouple and a dropping funnel. The flask was swept with nitrogen and charged with 200 milliliters of cyclohexane containing 10 grams of anhydrous aluminum chloride. Stirring was started and the water bath raised the temperature of the aluminum chloride/cyclohexane suspension to 30° C. The dropping funnel was charged with a 170 grams of dicyclopentadiene that had been washed with 6 percent aqueous sodium hydroxide inhibitor, but not dried after a second washing with water, 80 grams of (+)-limonene of technical grade from Eastman Kodak and 100 milliliters of cyclohexane. The feed stream was added as quickly as possible with the reaction temperature maintained at 32±2° C. After about 25 minutes, all of the feed had been added and the reaction temperature of 32±2° C. was maintained for three hours with stirring. A solution of 200 milliliters of isopropanol and 600 milliliters of water was added to the reaction mixture as the heat was removed. The aqueous-organic mixture was stirred vigorously until all of the catalyst had been hydrolyzed. The organic layer which contains a suspended solid was separated and washed with two portions of 200 milliliters of water. The organic layer which contained the suspended solid was dried in a drying oven at 150° C. and 28 inches of mercury vacuum. The product softens or shows wetting in a capillary melting point tube at 188 to about 208° C. with a molecular weight range of 700 to 40,000.

EXAMPLE 7

The reaction conditions and procedures of Example 6 were repeated at 42±2° C. to give a resin that softens or shows wetting in a capillary melting tube at 138 to 180° C. with a molecular weight range of 700 to 36,000.

EXAMPLE 8

Reaction conditions and procedures of Example 6 were repeated except the reaction was conducted at 52±2° C. to give a resin that softens or shows wetting in a capillary melting point tube at 134 to 156° C. with a molecular weight range of 700 to 24,000.

EXAMPLE 9

The dicyclopentadiene/limonene resin from Examples 6, 7, and 8 were combined by mixing 75 grams of each polymeric resin into a 2-liter stainless steel beaker. A hot plate was used to liquify the polymeric resins and stirring gave a homogeneous mixture. The blend was cooled to room temperature, and chipped into small granular pieces, which exhibited an overall softening range of from 132° C. to 191° C.

EXAMPLE 10

Three hundred parts of cyclohexane and 50 parts of anhydrous aluminum chloride were placed into a reactor. While continuously stirring the mixture, 600 parts of a hydrocarbon mixture was slowly added to the reactor over a period of about 60 minutes. The hydrocarbon mixture consisted of 30 percent inert hydrocarbons with the remaining 70 percent by weight of the mixture comprising the following resin forming components:

| Component | Percent |
| --- | --- |
| Limonene | 67.0 |
| Dicyclopentadiene | 33.0 |

The temperature of the reaction was maintained in a range of about 25° to 30° C. After an hour of agitation from the time of final addition, the hydrocarbon mixture was added to approximately 4,000 parts of a 25 percent solution of isopropyl alcohol in water to neutralize and decompose the aluminum chloride. The aqueous layer was removed and the resin solution washed with an additional 4,000 parts of the alcohol/water blend.

The resulting resin solution was steam-distilled at a pot temperature of about 235° C. The resulting residual molten resin was cooled to room temperature to provide an 85 percent yield of a hard brittle pale yellow resin having a softening point of 110° C. to 129° C. Small molecule GPC analysis gives a molecular weight distribution of 6.7 percent in the 9500 MW range, 69.1 percent in the 1100 MW range, 6.5 percent in the 600 MW range, 9.0 percent in the 450 MW range and 4.6 percent in the 330 MW range.

EXAMPLE 11

A rubber stock was prepared which consisted of styrene butadiene rubber and conventional amounts of carbon black antioxidant, sulfur and accelerator, fatty acid and zinc oxide. In addition, each sample contained a highly aromatic processing oil, highly paraffinic process oil and processed soybean oil. In Samples 1 and 3, the three oils were partially replaced with a polymeric dicyclopentadiene/limonene resin. In this study, each of the four polymeric resins prepared in accordance with Examples 1–4 was used at the 6 and 12 phr level (total resin was 24 and 48 phr) and compared with the control compounds. The table below provides the relative amounts of the various oils and resins. In addition, the properties of each of the resulting rubber stocks were tested and are listed in the table. The cured specimens of each rubber stock were prepared by press curing the sample at 150° C. for 28 minutes under 280 psi pressure with the exception of those specimens used to test for Strebler, Zwick Rebound, Light Blow Out and DIN Abrasion. The samples for testing for Strebler, Zwick Rebound and Light Blow Out were cured for 38 minutes. The specimens tested for DIN Abrasion were cured for 33 minutes.

TABLE I

| Sample | 1 | 2 | 3 | 4 |
| --- | --- | --- | --- | --- |
| Aromatic Processing Oil | 22.00 | 30.00 | 14.00 | 30.00 |
| Paraffinic Processing Oil | 22.00 | 30.00 | 14.00 | 30.00 |
| Process Soybean Oil | 22.00 | 30.00 | 14.00 | 30.00 |
| Example 1 Resin | 6.00 | | 12.00 | |
| Example 2 Resin | 6.00 | | 12.00 | |
| Example 3 Resin | 6.00 | | 12.00 | |
| Example 4 Resin | 6.00 | | 12.00 | |
| Productive Tests: | | | | |
| Rheometer MDR2000 @ 150° C. | | | | |
| S'Min (dN-m) | 2.7 | 2.4 | 3.1 | 2.6 |
| T (1) | 5.1 | 4.7 | 5.4 | 5.0 |
| TC25 | 5.8 | 5.4 | 6.3 | 5.7 |
| TC90 | 25.5 | 18.4 | 32.4 | 18.1 |
| S'Max (nD-m) | 10.0 | 10.1 | 10.4 | 10.5 |
| Delta S' (dN-m) | 7.3 | 7.4 | 7.2 | 8.0 |
| S" @ S'Max | 2.7 | 2.1 | 3.2 | 2.4 |
| TanD @ S'Max | 0.27 | 0.21 | 0.31 | 0.23 |
| Assigned Cures | 28 | 28 | 28 | 28 |
| Stress Strain | | | | |
| 300% Modulus (MPA) | 3.2 | 4.4 | 3.2 | 4.8 |
| Tensile (MPa) | 7.9 | 10.0 | 7.2 | 7.6 |
| Elongation (%) | 684 | 636 | 706 | 468 |
| Rebound | | | | |
| RT | 11.5 | 12.1 | 12.7 | 12.5 |
| 100°C. | 20.8 | 29.3 | 17.3 | 30.0 |
| Hardness | | | | |
| RT | 66.3 | 59.4 | 74.7 | 59.7 |
| 100° C. | 39.1 | 40.1 | 44.5 | 41.3 |
| Strebler Normalized to 0.2" | | | | |
| Avg Force (N) | 105 | 154 | 106 | N/A |
| | 110 | 143 | 121 | N/A |
| Zwick Rebound | | | | |
| 65° C. | 15.8 | 20.0 | 14.2 | 17.4 |
| 95° C. | 19.0 | 25.0 | 14.8 | 23.8 |
| 120° C. | 22.6 | 31.0 | 17.8 | 30.6 |
| 150° C. | 28.0 | 37.8 | 24.2 | 36.8 |
| Light Blow Out | | | | |
| Temp (F) | 319 | 310 | 362 | 307 |
| Time (Min) | 23 | 27.5 | 18 | 15 |
| DIN Abrasion | | | | |
| Rating | 274 | 279 | 282 | 278 |
| MTS Dynamic Modulus | | | | |
| E' (MPa) | 5.8 | 5.4 | 7.0 | 6.0 |
| Tan Delta | 0.45 | 0.39 | 0.48 | 0.40 |
| Autovibron at 60° C. | | | | |
| E' (MPa) | 20.8 | 16.5 | 40.9 | 15.1 |
| E" (MPa) | 4.2 | 2.9 | 6.1 | 2.5 |
| Tangent Delta | 0.19 | 0.18 | 0.15 | 0.17 |
| Autovibron at 100° C. | | | | |
| E' (MPa) | 11.8 | 9.6 | 17.5 | 9.0 |
| E" (MPa) | 3.2 | 1.6 | 3.5 | 1.4 |
| Tangent Delta | 0.19 | 0.17 | 0.20 | 0.16 |
| Autovibron at 150° C. | | | | |
| E' (MPa) | 10.4 | 8.0 | 14.1 | 7.5 |
| E" (MPa) | 1.8 | 1.1 | 2.7 | .9 |
| Tangent Delta | 0.17 | 0.13 | 0.19 | 0.13 |

As one can see from the above data, the effect of using the dicyclopentadiene/limonene resins in place of the aromatic processing oil, paraffinic processing oil and processed soybean oil was to increase the hysteresis (rebound, E", tangent delta) and low strain stiffness (E', hardness) while reducing the cure state (300 percent modulus), cure rate (T25, T90) and tear (Strebler). The dicyclopentadiene/limonene resins gave better storage modulus, loss modulus and tangent delta throughout the temperature range of 60° C. to 150° C. It is this response with temperature that provides enhanced traction and handling.

EXAMPLE 12

In this example, various resins were evaluated in a rubber compound.

Rubber compositions containing the materials set out in Tables 2 and 3 were prepared in a BR Banbury™ mixer using two separate stages of addition (mixing); namely, one non-productive mix stage and one productive mix stage. The non-productive stage was mixed for 3.5 minutes or to a rubber temperature of 160° C., whichever occurred first. The mixing time for the productive stage was to a rubber temperature of 120° C.

The rubber compositions are identified herein as Samples 1–3. Samples 1 and 2 are considered herein as controls without the use of the resin used in the present invention being added to the rubber composition. Samples 1 and 2 each contain commercially available resins. Sample 3 is the resin prepared in Example 10.

The samples were cured at about 150° C. for about 28 minutes.

Table 3 illustrates the behavior and physical properties of the cured Samples 1–3.

Lab data reveals that the new DCPD/Limonene resin in fact enhances the traction and durability properties simultaneously without following the typical tradeoff as previously described. Comparing the dynamic properties from the RPA 2000 and stress-strain data (UTS) of the Coumarone-Indene and phenolic resins, the typical tradeoff of sacrificing durability (lower G' at 40 percent strain, 300 percent modulus and tensile strength) for improved dry traction (increased tan delta and loss compliance at 40 percent strain) is demonstrated. Control A (phenolic resin) is a soft compound with high hysteresis. Control B (Coumarone-Indene resin) is a stiff compound with low hysteresis.

The DCPD/Limonene resin versus the Control A shows that the durability is significantly improved (G' at 40 percent strain, 300 percent modulus and tensile strength) and dry traction is maintained (tan delta and J" at 40 percent). Control B represents a typical effort to increase the durability of Control A through the use of resins. The DCPD/Limonene resin versus the Control B shows that the durability is only slightly reduced (G' at 40 percent strain, 300 percent modulus and tensile strength) and the dry traction is significantly improved (tan delta and J" at 40 percent).

| Samples | Ctrl 1 | Ctrl 2 | 3 |
|---|---|---|---|
| Non-Productive | | | |
| Emulsion SBR[1] | 100 | 100 | 100 |
| Carbon Black[2] | 80.0 | 80.0 | 80.0 |
| Aromatic Oil | 37.5 | 37.5 | 37.5 |
| Stearic Acid | 2.0 | 2.0 | 2.0 |
| Microcrystalline Wax | 2.0 | 2.0 | 2.0 |
| Zinc Oxide | 3.0 | 3.0 | 3.0 |
| Antioxidant[3] | 1.0 | 1.0 | 1.0 |
| Phenolic Resin[4] | 25.0 | 0 | 0 |
| Coumarone Indene[5] Resin | 0 | 25.0 | 0 |
| Resin of Example 10 | 0 | 0 | 25.0 |

| Samples | Ctrl 1 | Ctrl 2 | 3 |
|---|---|---|---|
| Productive | | | |
| Accelerators[6] | 3.5 | 3.5 | 3.5 |
| Accelerator[7] | 0.25 | 0.25 | 0.25 |
| Sulfur | 0.95 | 0.95 | 0.95 |

[1]Emulsion and SbR containing 40 percent styrene a Tg of 35° C. and a base Mooney of 110 when oil extended (37.5 phr oil) the Mooney was 48. The solution SBR was obtained from the Goodyear Tire & Rubber Company.
[2]$I_2$ = 122 and DBP = 114
[3]Polymerized 1,2-dihydro-2,2,4-trimethylquinoline
[4]Unreactive phenol-formaldehyde resin having a melting point of 106–114° C. (Ring and Ball) which is commercially available from Schenectady Chemical under the designation CRJ-418.
[5]Coumarone Indene Resin having a softening point of 100° C. which is commercially available from Neville Chemical under the designature Cumar ™ R-13.
[6]N-cyclohexyl benzothiazole-2-sulfenamide
[7]Tetramethyl thiuram disulfide

| Sample | 1 | 2 | 3 |
|---|---|---|---|
| Phenolic resin | 25.0 | 0 | 0 |
| Coumarone Indene Resin | 0 | 25.0 | 0 |
| Resin of Example 10 | 0 | 0 | 25.0 |
| RPA 2000, 15.8 min, 160° C., 17% strain, 1.67 Hz | | | |
| T25 (min) | 1.89 | 2.98 | 1.92 |
| T90 (min) | 9.3 | 9.7 | 9.7 |
| Min Torque (dNm) | 0.49 | 0.59 | 0.66 |
| Max Torque (dNm) | 1.76 | 2.28 | 2.28 |
| Delta Torque (dNm) | 1.27 | 1.69 | 1.62 |
| RPA 2000, 1 Hz, 100° C. | | | |
| G' 40% (KPa) | 376 | 476 | 449 |
| Tan Delta 40% | 0.254 | 0.224 | 0.277 |
| J" 40% 1/MPa | 0.63 | 0.45 | 0.57 |
| UTS, cure 28 minutes @ 150° C. | | | |
| 300% Modulus, MPa | 3.5 | 4.1 | 3.6 |
| Tensile Strength, MPa | 13.2 | 15.8 | 14.7 |
| Elongation, % | 719 | 718 | 740 |
| Zwick Rebound, 95°C. | 29.8 | 35.6 | 29.8 |
| Rebound 120° C. | 35.8 | 40.6 | 34 |

What is claimed is:

1. A resin composition consisting essentially of a polymer which is the reaction product of the polymerization reaction between dicyclopentadiene and limonene, said resin having a softening point ranging from about 50 to about 220° C. and a molecular weight ranging from about 500 to about 42,000.

2. A resin composition comprising a blend of two or more resins, wherein each resin consists essentially of the polymer which is the reaction product of the polymerization reaction between dicyclopentadiene and limonene and each resin has a softening point ranging from about 50 to about 220° C. and a molecular weight ranging from about 500 to about 42,000.

3. The resin composition of claim 1 wherein the blend comprises four individual resins.

4. The resin composition of claim 2 wherein said blend comprises three individual resins.

5. The resin composition of claim 1 wherein said composition consists essentially of the polymerization reaction product of from about 10 to about 1 moles of dicyclopentadiene and from about 1 to about 10 moles of limonene.

6. The resin composition of claim 2 wherein each resin is the polymerization reaction product of from about 1 to about 2 moles of dicyclopentadiene and from about 2 to about 1 moles of limonene.

7. The resin composition of claim 3 wherein the first resin has a softening point ranging from about 55 to about 75° C., the second resin has a softening point ranging from about 80 to about 131° C., the third resin has a softening point ranging from about 126 to about 168° C., and the fourth resin has a softening point ranging from about 168 to about 195° C.

8. The resin composition of claim 4 wherein the first resin has a softening point ranging from about 134 to about 156° C., the second resin has a softening point ranging from about 138 to about 180° C., and the third resin has a softening point ranging from about 188 to about 208° C.

9. The resin composition of claim 3 wherein the first resin has a molecular weight ranging from about 500 to about 15,000, the second resin has a molecular weight ranging from about 700 to about 15,000, the third resin has a molecular weight ranging from about 3,000 to about 15,000, and the fourth resin has a molecular weight ranging from about 4,000 to about 15,000.

10. The resin composition of claim 4 wherein the first resin has a molecular weight ranging from about 700 to about 24,000, the second resin has a molecular weight ranging from about 700 to about 36,000, and the third resin has a molecular weight ranging from about 700 to about 42,000.

11. The resin composition of claim 1 wherein said polymerization is conducted in the presence of a catalyst.

12. The resin composition of claim 11 wherein said catalyst is selected from the group consisting of $H_2SO_4$, HCl, $H_3PO_4$ $HClO_4$, $BF_3$, $BCl_3$, $AlCl_3$, $AlBr_3$, $SnCl_4$, $ZnCl_2$, $SbCl_3$, and etherates of said acid catalyst.

13. The resin composition of claim 1 wherein said polymerization is a thermal polymerization.

* * * * *

UNITED STATES PATENT AND TRADEMARK OFFICE
CERTIFICATE OF CORRECTION

PATENT NO. : 6,300,449 B2
DATED : October 9, 2001
INVENTOR(S) : Lawson Gibson Wideman et al.

It is certified that error appears in the above-identified patent and that said Letters Patent is hereby corrected as shown below:

Column 7,
Line 5, change "Theological" to -- rheological --

Column 12,
Line 11, change "SbR" to -- SBR --

Signed and Sealed this

Twenty-first Day of May, 2002

Attest:

Attesting Officer

JAMES E. ROGAN
Director of the United States Patent and Trademark Office